2,879,206
Patented Mar. 24, 1959

2,879,206

OXYGENATION IN THE 6 AND 11 POSITIONS BY ENTOMOPHTHORA

Adolph Weintraub and Peter D. Meister, Kalamazoo, Mich., assignors to The Upjohn Company, Kalamazoo, Mich., a corporation of Michigan No Drawing. Application June 6, 1952
Serial No. 292,190

8 Claims. (Cl. 195—51)

This invention relates to a process for the fermentative production of oxygenated steroids. More particularly it relates to a process of oxygenating a steroid by the action of a species of fungus of the order Entomophthorales.

It is an object of this invention to provide a novel method for the introduction of oxygen into a steroid molecule, thus producing valuable pharmacologicals and intermediates therefor. Another object is the provision of a process of 11-hydroxylating steroids. Other objects will be apparent to those skilled in the art to which this invention pertains.

The method of the present invention involves aerobically subjecting a steroid to the oxygenating action of a fungus of the order Entomophthorales.

The steroids operative in the method of the present invention are not limited as to type or number of substituents, and for operativeness in the process need only contain a nuclear unoxygenated or oxygenatable position, such as, for example, an unoxygenated eleven position; illustratively, a methylene group, as in an eleven desoxy-steroid. Such compounds contain the nucleus:

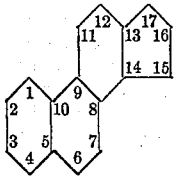

which may in addition contain substituents or combinations of substituents about the nucleus, as in the 1, 2, 3, 4, 5, 6, 7, 8, 9, 10, 12, 13, 14, 15, 16, and 17 positions, especially 10,13-dimethyl groups, 3,7, or 12 keto, hydroxy, or acyloxy groups; 17-side chains of which the progesterone and corticosterone (Ketol) side chain deserve special mention; a 17 keto group; a 17 hydroxy group, and the like; as well as double bonds in the 4, 5, 6, 7, 8, 9(11), 11(12), 16(17) and other positions, or combinations of positions, about the nucleus; or double bonds saturated by addition thereto of halogen or hydrogen halide; adducts of dienophiles such as maleic acid, maleic anhydride, or maleic acid esters with steroids having a conjugated double bond system, as at 5,7; and other substituents and combinations of substituents, double bonds and so forth too numerous for special mention, a great many of which are known in the steroid art. The presence or absence of unsaturation at the 9(11) or 11(12) positions of the nucleus is not a critical factor in the method of the present invention, for, while it is preferred to apply the process to a steroid having an eleven methylene group, i.e., a steroid having two hydrogen atoms at carbon atom eleven or no unsaturation in the 9(11) or 11(12) positions, for reasons of economy and to obviate unnecessary transformations of saturated to unsaturated compounds, the biooxidation may be applied with equal facility to either the saturated or unsaturated compounds.

Representative steroids which may be oxygenated by the method of the invention include, for example, progesterone, 9(11) or 11(12)-dehydroprogesterone, 7,9(11)-bisdehydroprogesterone, 17 - hydroxyprogesterone, pregnenolones, 3-hydroxy-5-pregnene-20-one, pregnenolone, 3β - hydroxy - 5,16 - pregnadiene - 20 - one, acyloxy-pregnenolones such as pregnenolone acetate, 3-hydroxy-5,6-oxidopregnane-20-one (α- or β-oxido), 3-hydroxy-5-chloropregnane-20-one, 5,6-oxidopregnane-3,20-dione (α- or β-oxido), 4-bromo and 4-chloropregnane-3,20-dione, 5-chloropregnane-3,20-dione, 3-ketopregnane-20-ol, 3-keto-allopregnane-20-ol, 3β-hydroxy-16,17-oxido-21-acetoxy - 5 - pregnene - 20 - one, 3β - hydroxy - 16,17-oxido-5-pregnene-20-one, 3β-hydroxy-5,6,21-tribromo-16, 17 - oxidopregnane - 20 - one, 3β - hydroxy - 16 - bromo-17-hydroxy-5-pregnene-20-one, 3β-hydroxy-16-chloro-17-hydroxy-5-pregnene-20-one, 3β-hydroxy-5(6),16(17)-di-oxidopregnane-20-one, 3β-hydroxy-5(6),16(17)-dioxido-21-bromopregnane-20-one, 3β-hydroxy-5(6),16(17)-di-oxido - 21- acetoxypregnane - 20 - one, 3β - hydroxy-5(6),16(17)-dioxido-21-hydroxypregnane-20-one, 11-desoxycorticosterone, delta-9(11) or 11(12)-desoxycorticosterone, 11-desoxy-17-hydroxycorticosterone and acyloxy derivatives, such as the acetoxy derivative, thereof, 21-hydroxypregnenolone and 21-acyl, e.g. acetyl, esters thereof, 17-21-dihydroxypregnenolone and 17,21-diacyloxy derivatives thereof, e.g. the diacetoxy derivative, androstenedione, androstan-17-ol, 9(11) or 11(12)-dehydroandrostenedione, 3-hydroxy-9(11) or 11(12)-pregnen-20-ones, 3,21-dihydroxy-9(11) or 11(12)-pregnen-20-ones, 3,17,21-trihydroxy-9(11) or 11(12)-pregnen-20-ones, 4-androsten-3-ol-17-one and 3-acyl, e.g. acetyl, esters thereof, 5-androsten-3-ol-17-one and 3-acyl, e.g. acetyl, esters thereof; ergosterol, stigmasterol, stigmastanol, and 3-acyl, e.g. acetyl, esters of the foregoing; ergostenone, stigmastenone, stigmastanone, cholestenone, cholic acid, desoxycholic acid, lithocholic acid, cholanic acid, norcholanic acid, bisnorcholanic acid, cholenic acid, norcholenic acid, bisnorcholenic acid, and 3-hydroxy-, 3-keto-, 3,7-dihydroxy-, 3,7-diketo-, 3,7,12-trihydroxy-, 3,7,12-triketo-, 9(11) or 11(12)-unsaturated, ester, thiolester, and further derivatives of the foregoing acids, and the like. Suitably a steroid having up to and including 22 carbon atoms in the carbon to carbon skeleton or a steroid having a two carbon atom side chain at the 17 position and an eleven methylene group may be used. The 10-nor-methyl, the 13-nor-methyl, and the 10,13-bisnor-methyl forms of each of the above steroids, in which either one or both of the 18 and 19 position angular methyl groups are replaced by hydrogen, are included within the purview of those steroids which may be oxygenated by the method of this invention. In the event that the 11-position is already oxygenated or substituted, the dominant product may be oxygenated additionally in another position. The 16-dehydro form of each of the above steroids is likewise included. All of these are amenable to oxygenation with Entomophthorales fungi.

The biological oxygenation is carried out with the employment of an oxygenating fungus which is a species of a genus of the order Entomophthorales. The classification and definition of Entomophthorales as herein employed is that of Bessey, E. A., "Morphology and Taxonomy of Fungi," pages 172 to 177 and 186, Blakiston, Philadelphia, 1950. Only one family, the Entomophthar-aceae, is recognized in this order although Couch (1939) suggested making an additional family in the order by placing the genus Basidiobolus in the family Basidiobol-aceae. Species of the genera useful in the oxygenation of steroids include Conidiobolus, C. brefeldianus, C. villosus; Basidiobolus, B. ranarum; Acylistes; Completoria; Massospora, M. cicada; Entomophthora, E. coronata, E. sphaerosperma, E. sepulchralis, E. pseudococci, E. fresenii, and E. grylli. The genus Entomophthora has sometimes been named Empusa, however the name Empusa is not desirable for it has priority as a name for an orchid.

Culture of the fungi, for the purpose and practice of the present invention, is in or on a medium favorable to the development of the fungi. Solid media may be utilized, but the preferred media are those which permit quantitative growth under aerobic conditions. Moist solid particulate media such as bran, cereal grains, cereal grits, wood chips, shavings, sawdust, cornhusks, fibrous material such as copra, chestnuts, or lupine seeds may be used. These can be extracted with alcohol, ether or other organic solvents, to remove objectionable contaminants and growth inhibitors prior to fermentation. The carriers may optionally contain added growth factors and nutrients and may be used in layers or trays with or without auxiliary aeration, in towers as in the vinegar process or under conditions of agitation as for example by tumbling in a rotating drum. Liquid media are well adapted to use under aerobic layer or more especially aerobic submerged fermentation conditions. Suitably the media should contain sources of available carbon, nitrogen and minerals although of course there can be significant growth and development under less then optimum conditions.

Available carbon may be from carbohydrates, starches, gelatinized starches, dextrin, sugars, molasses as of cane, beet and sorghum, glucose, fructose, mannose, galactose, maltose, sucrose, lactose, pentoses, amino acids, peptones or proteins. Carbon dioxide, glycerol, alcohols, acetic acid, sodium acetate, citric acid, sodium citrate, lower fatty acids, higher fatty acids, or fats are illustrative of other materials which provide assimilable carbon for the energy requirements of the fungi.

Nitrogen in assimilable form may be provided by soluble or insoluble vegetable or animal proteins, soybean meal, lactalbumin, casein, egg albumin, peptones, polypeptides or amino acids, urea, ammonium salts, or ammonia trapped on base exchange resins or zeolites. Whey, distillers solubles, corn steep liquor, or yeast extract have been useful.

As mineral constituents the media or menstruum may contain, naturally present or added, available calcium, cobalt, copper, gallium, iron, magnesium, manganese, molybdenum, potassium, scandium and vanadium. Sulfur may be provided by sulfates, alkyl sulfonates, sulfoxylates, sulfinates, sulfides, free sulfur, thiosulfate, methionine, cystine, cystein, thiamin or biotin. Phosphorus, particularly in a concentration at or about 0.001 to 0.07 and preferably 0.015 to 0.02 molar, may be present as ortho-, meta-, or pyrophosphates, salts or esters, phytin, phytate, glycerophosphate, sodium nucleinate, casein, or ovovitellin. Boron and iodine in traces may be desirable.

Other accessory growth factors, vitamins, auxins and growth stimulants may be provided as needed or desired.

While solid or liquid media may be utilized, liquid media is preferred as it favors mycelial growth.

Carbohydrate and fat are not essential for the growth of Entomophthorales but carbohydrate provides an economic energy source for the fungi. Amino acids or proteins, separately or together, are desirable for a complete life cycle of the fungi.

Suspending or mycelial carriers such as filter earths, filter aids, finely divided cellulose, wood chips, bentonite, calcium carbonate, magnesium carbonate, charcoal, activated carbon or other suspendable solid matter, methyl cellulose, carboxymethyl cellulose or alginates may be added to facilitate fermentation, aeration and filtration.

The selected species of fungus of the order Entomophthorales is suitably grown either in light or darkness on a medium containing available carbon, illustratively carbohydrates such as sugars, or starches; assimilable nitrogen, illustratively soluble or insoluble proteins, peptones or amino acids; and mineral constituents, illustratively phosphates and magnesium sulfate; and other art recognized, desirable or adventitious, additions. The medium may desirably have a pH before inoculation of between about 4 and 7 although a higher or lower pH may be used. A pH of, or about, 6.5 is most favorable to the growth of Entomophthorales but fermentation at a lower pH is desirable for the inhibition of bacterial contamination. Alternatively or concomitantly, bacterial contamination may be retarded by the presence of antiseptic or antibiotic agents such as benzoates, sulfites, penicillin or circulin.

Inoculation of the fungal growth-supporting medium with the selected fungus of the order Entomophthorales may be accomplished in any suitable manner. Entomophorales grow luxuriantly at a temperature of, or about, twenty degrees centigrade and growth of the fungi is readily promoted by maintaining an incubation temperature of about room temperature, e.g. fifteen to thirty degrees centigrade although lower or higher temperatures are also operative.

The period of fungal growth required before the steroid to be oxygenated is exposed to the oxygenating activity of the fungus does not appear to be critical. For example, the steroid may be added either before thermal or other sterilization of the medium, at the time of inoculating the medium with the selected Entomophthorales species, or at some time, e.g. 24 to 48 hours, later. The steroid to be oxygenated may be added at any desired concentration although for practical reasons steroid substrate at a concentration of, or about, 0.01 gram to 0.25 gram or up to about 0.6 gram per liter of media or even 0.8 gram per liter is satisfactory and higher concentrations, although somewhat inimical to fungal growth, may be used. Either a purified steroid, a crude material containing steroid, or a steroid material comprised of or consisting predominantly or essentially of steroid for example a mixture of steroid and fat, or steroid and solvent, may be used as substrate. The addition of the steroid substrate to be oxygenated may be accomplished in any suitable manner especially so as to promote a large surface of contact of the steroid substrate with the oxygenating activity of the fungus and/or fungal enzymes, such as by dispersing the steroid substrate, either alone, with a dispersing agent, or in solution in a water-miscible organic solvent, by mixing or homogenizing the steroid substrate with the fungal medium to form a suspension or dispersion of steroid. Either submerged or surface culture procedures may be used with facility, although submerged culture is preferred. Alternatively, the oxygenating activity or oxygenating enzymes of a growth of the fungus may be separated from the fungus or medium, admixed with the steroid or a solution or dispersion thereof, and the mixture subjected to aerobic conditions to accomplish oxygenation of the steroid.

The temperature during the period of oxygenation of the steroid may be the same as that found suitable for fungal growth. It need be maintained only within such range as supports life, active growth, or the oxygenating activity of the fungus.

While any form of aerobic incubation is satisfactory for the growth of the selected fungus or the bio-oxygenation of the steroid substrate, the efficiency of oxygenation is related to aeration. Therefore, aeration is usually controlled, as by agitation and/or blowing air through the fermentation medium. Aeration may be effected by surface culture or under submerged fermentation conditions. Aerobic conditions include not only the use of air to introduce oxygen, but also mixed other sources containing oxygen in free or liberatable form. In using air, as the aerating medium, a particularly desirable rate of aeration is about or within the range of six to eight millimoles of oxygen per hour per liter of sulfite as determined by the method of Cooper, Fernstrom and Miller, Ind. Eng.

Chem. 36, 504 (1944). Under some conditions it is desirable to utilize different rates of aeration during the fungus growing or developing state as contrasted with the steroid oxygenating state. Aeration is suitably modified by using superatmospheric or subatmospheric pressures, for example thirty pounds per square inch or ten pounds per square inch absolute. Oxygen uptake may be facilitated by the addition of various catalysts such as ascorbic acid, glutamic acid, citric acid, lactic acid, tyrosine, or tryptophane.

The time required for the bio-oxygenation of steroids varies according to the results desired. When the steroid substrate is present at the time of inoculation of the medium, periods of from eight to 72 hours may be used. However, when the steroid is added to the fungus, fungal medium, fungal enzymes, or the fermentation liquor after substantial aerobic growth of the fungal organism, e. g. after 16 to 24 hours at optimum temperature, the conversion of the steroid substrate begins immediately and high yields are obtained in from one to 72 hours, 24 hours being satisfactory. The oxygenated steroids, in a heterofermentative procedure resulting in other useful products, such as for example, acids, antibiotics, or proteolytic enzymes, may be separated from the fermentation beer before or at the time the fermentation is complete with respect to the other fermentation products. In lieu of direct contact of the steroid to be oxygenated with the fermenting media containing viable Entomophthorales fungi, the steroid may be oxygenated by contact with the fermented liquor, free of fungi, or with the fungi or enzymes of Entomophthorales preferably in the presence of an aqueous menstruum, or with the enzymes obtained from the fungi.

After completion of the oxygenating fermentation reaction, the resulting oxygenated steroid is recovered from the fermentation reaction mixture. An especially advantageous manner of recovering the oxygenated steroid involves extracting the fermentation reaction mixture, including the fermentation liquor and mycelia in cases where the steroid was added directly to the growing culture, with a water-immiscible organic solvent for steroids, e. g. methylene chloride, ethylene chloride, trichloroethylene, ether, amyl acetate, and the like. The fermentation liquor and mycelia may be separated and then separately extracted with suitable solvents. The mycelia may be extracted with either water-miscible or water-immiscible solvents, acetone being effective. The fermentation liquor, freed of mycelia, may be extracted with water-immiscible solvents. Suitably, the unseparated or separated mycelia may be lysed, as by heat or chemicals, before or during extraction whether or not the entire beer or the separated mycelia and liquor are to be extracted. The extracts can be combined, either before or after washing with an alkaline or sodium bicarbonate solution, suitably dried, as for example over anhydrous sodium sulfate, and the purified oxygenated steroid obtained by recrystallization from organic solvents or by chromatography.

The following examples are illustrative of the process and products of the present invention and are not to be construed as limiting.

EXAMPLE 1

Conidiobolus sp. NRRL 1612

A medium was prepared of twenty grams of Edamine enzymatic digest of lactalbumin, three grams of corn steep liquor, and fifty grams of technical dextrose, diluted to one liter with tap water, and adjusted to a pH of 6.85. Twelve liters of this medium, having a pH of 6.2 after thermal sterilization, was inoculated with Conidiobolus species NRRL 1612 and incubated for 24 hours at a temperature of 28 degrees centigrade using a rate of aeration and stirring such that the oxygen uptake was 6.3 to 7 millimoles per liter of $Na_2SO_3$ according to the method of Cooper, Fernstrom and Miller, Ind. Eng. Chem. 36, 504 (1944). To this medium containing a 24-hour growth of Conidiobolus was added two grams of $17\alpha,21$-dihydroxy-4-pregnene-3,20-dione in 300 milliliters of absolute ethanol to provide a suspension of the steroid in the culture. After an additional 24-hour period of incubation under the same conditions of temperature and aeration, the beer and mycelium were extrated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts, including solvent, were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent, and filtering, the solvent was removed by distillation to give 10.797 grams of oily solid.

The oily solid was dissolved in 100 milliliters of ethylene dichloride and chromatographed over 400 grams of Florisil magnesium silicate using 650-milliliter portions of solvent fractions as indicated in Table I.

TABLE I

| Fraction | Solvent | Eluate Solids, Milligrams |
|---|---|---|
| 1 | ethylene dichloride | 4,207 |
| 2 | do | 655 |
| 3 | ethylene dichloride-acetone 15 : 1 | 2,107 |
| 4 | do | 64.5 |
| 5 | $EtCl_2$-acetone 10 : 1 | 77.0 |
| 6 | do | 152.0 |
| 7 | do | 227.5 |
| 8 | $EtCl_2$-acetone 8 : 1 | 197.5 |
| 9 | do | 131.5 |
| 10 | do | 95.5 |
| 11 | $EtCl_2$-acetone 5 : 1 | 155.0 |
| 12 | do | 133.0 |
| 13 | do | 80.0 |
| 14 | $EtCl_2$-acetone 3 : 1 | 76.0 |
| 15 | do | 61.5 |
| 16 | $EtCl_2$-acetone 1 : 1 | 204.5 |
| 17 | do | 161.0 |
| 18 | Acetone | 151.5 |

Eluate solids from fractions 12 and 13 were combined and triturated with thirty milliliters of ether. To this ether solution, acetone was added dropwise until the cloudy solution was completely clear, and the solvents were then evaporated at room temperature. The partially crystalline residue was treated once more in the same manner. Then the crystals which had formed were washed with ten milliliters of ether-acetone 50:1. Recrystallization of the crystals from five milliliters of methanol gave 38.5 milligrams of crystals melting at 196 to 210 degrees centigrade. Two additional recrystallizations from two-milliliter portions of methanol gave ten milligrams of crystalline 4-pregnene-6,$17\alpha$,21-triol-3,20-dione having a melting point of 232 to 235 degrees centigrade and an optical rotation, $[\alpha]_D^{23}$ of minus 88 degrees (c.=0.172 in 96 percent ethanol). Structure was verified by infrared spectrum.

The 4-pregnene-6,$17\alpha$,21-triol-3,20-dione demonstrates anaesthetic, androgenic, corticoid, progesterone, anabolic, and anti-hypertensive activities.

Fractions 17 and 18 were combined and triturated with twenty milliliters of ether to which a few drops of acetone was added to remove cloudiness of the solution. Evaporation of the solvents at room temperature followed by two more of the same ether-acetone purifications gave a mixture of oil and crystalline material which, upon washing with 25 milliliters of ether-acetone 50:1, gave 61.6 milligrams of crystals. Recrystallization twice from five-milliliter portions of methanol gave 33.5 milligrams of 4-pregnene-11α,17α,21-triol-3,20-dione having a melting point of 206 to 209 degrees centigrade, and an optical rotation $[α]_D^{23}$ of plus 82 degrees (c.=0.912 in methanol). Infrared spectrum confirmed the structure.

Esterification of 4-pregnene-11α,17α,21-triol-3,20-dione with an acylating agent, such as an acid anhydride, acetic anhydride, or acyl halide, and thereafter oxidizing the thus-produced 4-pregnene-11α,17α-diol-21-acyloxy - 3,20-dione with, for example, chromium trioxide, produced an ester of cortisone.

EXAMPLE 2

*Basidiobolus ranarum*

Following the procedure in Example 1, using *Basidiobolus ranarum* Eidam (Centraalbureau voor Schimmelcultures, Baarn, Netherlands, obtained from Central Laboratory of the South Manchurian Railway Company, Darien, Manchuria), in place of Conidiobolus produced similar results.

EXAMPLE 3

*Entomophthora coronata*

Following the procedure in Example 1, using *Entomophthora coronata* (Cost.) Kevorkian A.T.C.C. No. 10151 in place of Basidiobolus produced similar results.

EXAMPLE 4

*Entomophthora coronata*

Following the procedure in Example 1, using *Entomophthora coronata* (Cost.) Kevorkian A.T.C.C. No. 10151 in place of Basidiobolus and progesterone in place of 4-pregnene-11α,17α,21-triol-3,20 dione produced oxygenated progesterone.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A process for the production of an eleven oxygenated steroid comprising the steps of aerobically subjecting a steroid containing an eleven methylene group to the action of oxygenating enzymes produced by a growth of a species of fungus of the order Entomophthorales and recovering the resulting eleven oxygenated steroid.

2. The process of claim 1 wherein the resulting eleven oxygenated steroid is recovered by extraction.

3. A process for the introduction of oxygen into a steroid which comprises: contacting a steroid substrate, consisting essentially of steroid, under submerged aerobic fermentation conditions, with the oxygenating activity of a species of fungus of the order Entomophthorales to produce an oxygenated steroid and continuing the fermentation until a substantial amount of 11α-oxygenated steroid is present in the fermentation medium.

4. A process comprising contacting a steroid, having an eleven methylene group and up to and including 22 carbon atoms in the carbon to carbon skeleton, under aerobic, agitated conditions, with growing fungus of a species of the order Entomophthorales until a substantial amount of 11α-oxygenated steroid is present in the fermentation medium.

5. The process of claim 4 wherein the starting steroid is selected from the group consisting of progesterone, pregnane-3,20-dione, 17α-hydroxyprogesterone, 17α,21-dihydroxy-4-pregnene-3,20-dione, 21-hydroxy-4-pregnene-3,20-dione, 4,16-pregnadiene-3,20-dione, and 3β-hydroxy-5,16-pregnadiene-20-one.

6. A process for the production of a member of the group consisting of an 11α-oxygenated steroid and a 6-oxygenated steroid comprising the step of aerobically subjecting a steroid containing an 11-methylene group to the action of oxygenating enzymes produced by a growth of a species of fungus of the order Entomophthorales and continuing fermentation until a substantial amount of one of the group consisting of an 11α-oxygenated steroid and a 6-oxygenated steroid is present in the fermentation medium.

7. A process for the production of 6,17α,21-trihydroxy-4-pregnene-3,20-dione which comprises contacting 17α,21-dihydroxy-4-pregnene-3,20-dione under submerged areobic fermentation conditions, with the oxygenating activity of Conidiobolus species NRRL 1612 until a substantial amount of 6,17α,21-trihydroxy-4-pregnene-3,20-dione is present in the fermentation medium.

8. A process for the production of 11α,17α,21-trihydroxy-4-pregnene-3,20-dione, which comprises contacting 17α,21-dihydroxy-4-pregnene-3,20-dione under submerged aerobic fermentation conditions with the oxygenating activity of Conidiobolus species NRRL 1612 until a substantial amount of 11α,17α,21-trihydroxy-4-pregnene-3,20-dione is present in the fermentation medium.

References Cited in the file of this patent

UNITED STATES PATENTS 2,602,769     Murray et al. _____ July 8, 1952

OTHER REFERENCES

Sawyer, Jr.: American Journal of Botany, vol. 16, pp. 87–118 (1929).